Figure 1:
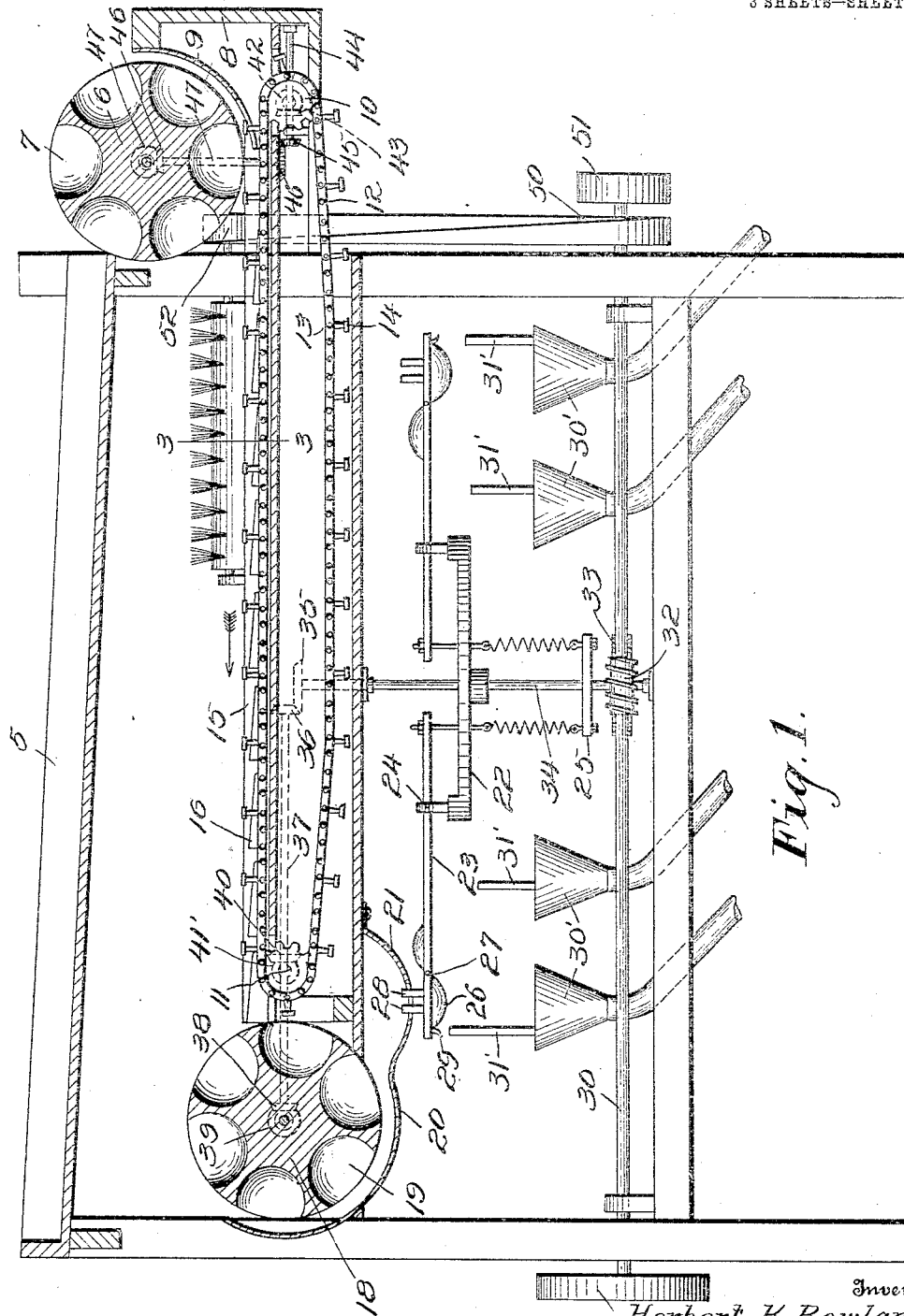

H. K. ROWLAND & L. H. LARSEN.
FRUIT GRADING AND CLEANING DEVICE.
APPLICATION FILED MAY 26, 1909.

956,426.

Patented Apr. 26, 1910.
3 SHEETS—SHEET 1.

Witnesses
K. Allen
Wm. Toeth.

Inventors
Herbert K. Rowland
Lars H. Larsen.

By Victor J. Evans
Attorney

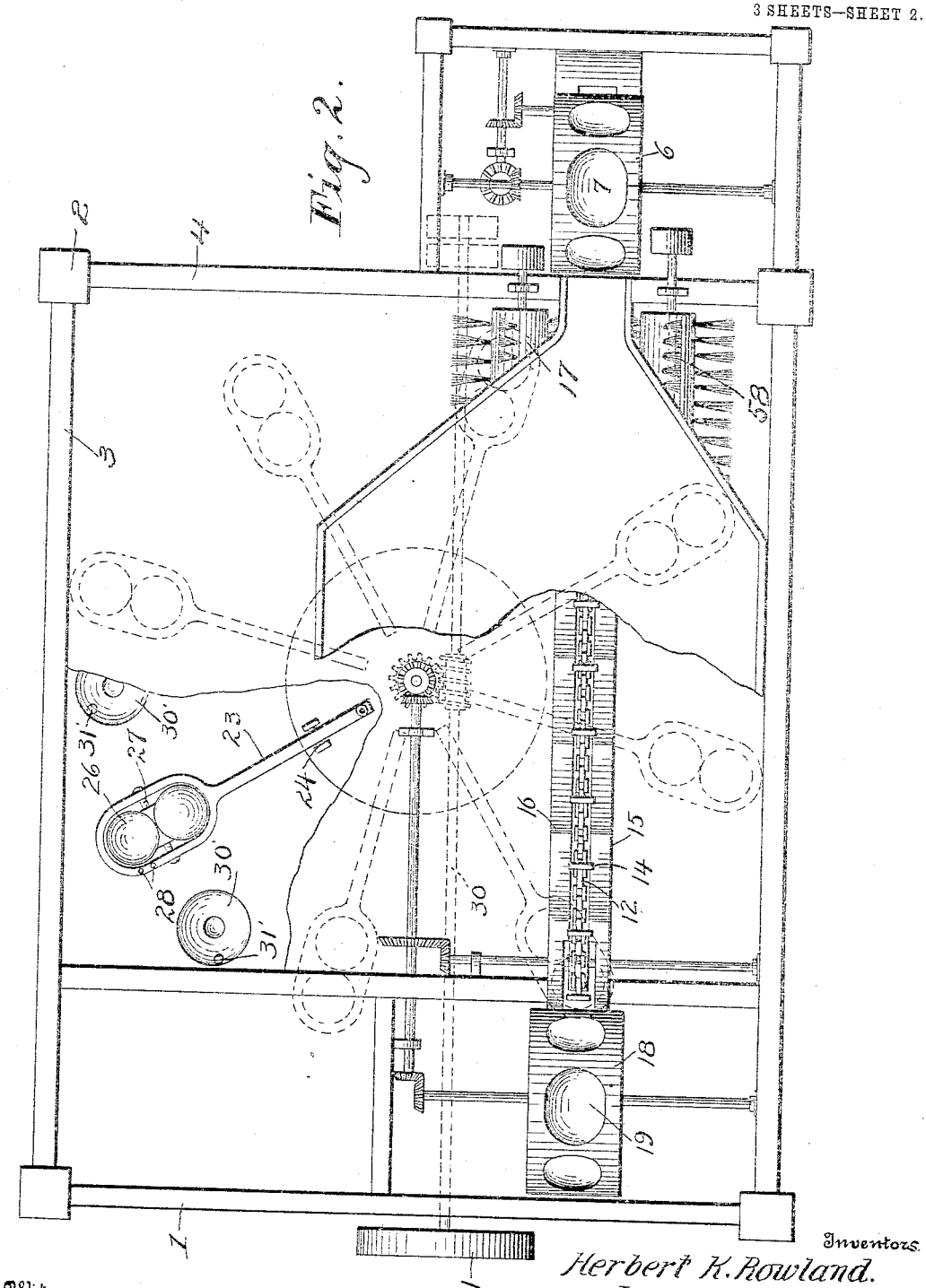

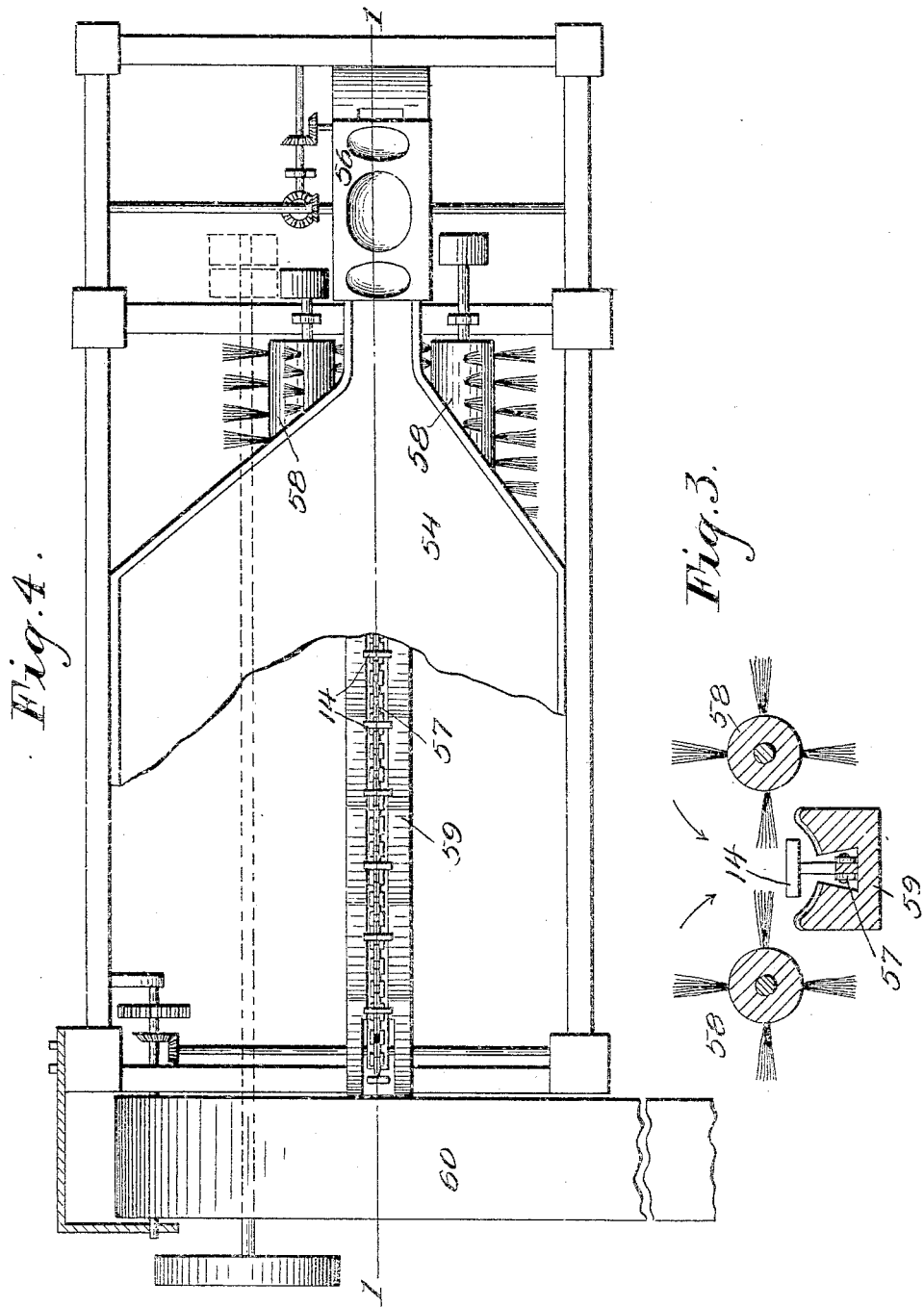

UNITED STATES PATENT OFFICE.

HERBERT K. ROWLAND AND LARS H. LARSEN, OF ZILLAH, WASHINGTON.

FRUIT GRADING AND CLEANING DEVICE.

956,426.

Specification of Letters Patent. Patented Apr. 26, 1910.

Application filed May 26, 1909. Serial No. 498,479.

*To all whom it may concern:*

Be it known that we, HERBERT K. ROWLAND and LARS H. LARSEN, citizens of the United States, residing at Zillah, in the county of Yakima and State of Washington, have invented new and useful Improvements in Fruit Grading and Cleaning Devices, of which the following is a specification.

This invention relates to fruit grading and cleaning devices, and the principal object of the invention is to provide a device of this character wherein the fruit will be automatically fed to a feed wheel and from thence delivered to an endless conveyer, the said conveyer being provided with spaced up-standing members or partitions and passing through a dividing track having inclined faces whereby the fruit is revolved as it is forced by each of the inclinations, the fruit in the meantime being subjected to the operation of oppositely disposed brush members and being deposited into the pockets of the receiving wheel and from thence deposited upon a table from which they will be delivered to suitable cups attached to arms provided by a rotary member, and the said cups adapted to be contacted by fingers or projections upon suitable chutes or conveyers, the projections upon the conveyers being of different lengths to contact with the various weights of the fruit deposited within the cups.

With the above and other objects in view, the invention consists in certain novel features of construction as hereinafter shown and described and then specifically pointed out in the claims.

In the drawings there has been illustrated a simple and preferred embodiment of the invention, and in which:—

Figure 1 is a longitudinal section on the line 1—1 of Fig. 2. Fig. 2 is a top plan view of the device. Fig. 3 is a detail sectional view taken upon the line 3—3 of Fig. 1. Fig. 4 is a top plan view of the slightly modified form of the device.

In the drawings, and referring particularly to Figs. 1 to 3 inclusive, the numeral 1 designates the frame of the apparatus. This frame 1 is of a substantially rectangular formation, comprising four standards designated by the numeral 2 provided with longitudinally connecting bars 3 and transverse connecting bars 4.

Positioned upon the upper portion of the frame 1 is a hopper 5 which is adapted for the reception of the fruit. This hopper 5 is inclined, as clearly shown in Fig. 1 of the drawings, so that the fruit may be automatically fed toward a feed wheel 6. This feed wheel 6 is provided with a plurality of peripheral pockets 7 each of which being adapted for the reception of a single fruit delivered from the hopper. These pockets 7 are of a shallow depth so as to accommodate the smallest as well as the largest fruit delivered from the hopper.

The numeral 8 designates an extension of the frame and the numeral 9 designates a curved apron corresponding with the peripheral contour of the feed wheel 6, but positioned a suitable distance away from the wheel 6, so that the fruit delivered into any one of the pockets 7 may be free to pass an endless belt, hereinafter to be described. By this means it will be noted that a small sized fruit as well as a large sized fruit may be readily positioned within the pockets of the wheel 6 and may be also readily delivered to the said endless belt without necessitating the pockets being constructed of different depths.

The numeral 10 designates a sprocket wheel positioned within the extension 8 of the frame 1 and the numeral 11 designates a similar sprocket wheel positioned a suitable distance away from the sprocket 10 at the opposite end of the frame. Connecting these sprocket wheels 10 and 11 is an endless belt 12. This belt 12 may be of the ordinary sprocket chain formation and is provided with a plurality of spaced projections 13 terminating in transversely arranged head portions 14. The sprocket 12 is adapted to travel between a divided track 15 arranged longitudinally of the frame, and this divided track is provided upon each of its sides with inclined outwardly extending faces or members 16. By this arrangement it will be noted that as the endless conveyer is moved, in a manner hereinafter fully described, in the direction of the arrow indicated in Fig. 1 of the drawings, the fruit delivered within one of the compartments provided by the spaced extending projections 13 is forced upwardly upon the inclined faces 16 until it reaches the uppermost portion thereof and is from thence dropped to the lowermost of the next inclined face so as to thoroughly revolve the fruit while being delivered upon the conveyer.

The numerals 17 and 18 designate a pair of oppositely arranged brush or cleaning members. These members 17—18 are arranged adjacent the sides of the track 15 and are adapted to rotate in a direction toward each other, so that the fruit passing within the path of the brushes or cleaning members are rotated in an opposite direction to that impelled by the longitudinal movement of the endless conveyer in combination with the inclined faces of the track 15.

The mechanism for operating the endless conveyer as well as the feed wheel and cleaning brushes will hereinafter be fully set forth.

Positioned upon the frame 1 at a lower inclination from the feed wheel 6 and in a direct path with the endless conveyer 12, is a receiving wheel 18. This wheel 18 is also provided with a peripheral recess or pockets 19, and these pockets are adapted for the reception of fruit delivered from the conveyer 12. The receiving wheel 18 is adapted to deposit the fruit upon a suitable table 20 positioned directly below the said wheel and this table 20 is inclined so as to allow the fruit to be delivered within a suitable basin or receptacle 21.

The numeral 22 designates a cylindrical member provided with a plurality of radiating arms 23. Each of these arms 23 is pivotally connected with the member 22 as designated by the numeral 24 and the inwardly extending portions of these arms are resiliently connected with a bracket member 25. The opposite ends of these arms 23 are provided with cup members 26. These cup members 26 are arranged in pairs and are of a substantially S-shaped formation so that one of the cups has its receiving mouth adjacent the end of the rod 23 while the inverted portion of the second cup is positioned directly opposite the said mouth. These cups 26 are pivotally connected with the arms 23 as designated by the numeral 27, and the arm 23 is provided with upstanding projections 28 which are adapted to project through a suitable opening in the member 21 and to force one of the fruit contained therein within the mouth of one of the cups 26. The cup 26 adjacent the end of the rod 23 is secured thereto through the medium of a suitable catch 29 and the weight of the fruit acting upon the resiliently sustained arm 23 will lower the said cup in accordance with its weight.

Positioned directly beneath the cups and the catches 29 provided for the same is a plurality of receiving members 30. Each of these members 30 is provided with an up-standing trip member 31'. These trip members 31' are arranged at various heights so as to contact the catches 29 of the various arms 23 as they are rotated in their direction. By this means it will be noted that fruit of various weights are tilted upon their arms 23 and thereby bringing their catch members so that when a fruit deposited within the cup is of a certain weight it will be contacted by the member 21 agreeing with the length of the arm 31' and alining with the tilted member 23 which is actuated by the weight of the fruit deposited within the member 26. It will be further noted that by arranging the cups in pairs of a substantially S-shaped formation that when one of the cups is rotated to deliver the fruit to the receiving members 30, the oppositely arranged cup will be swung around and retained in position through the medium of the catch to receive the next fruit to be deposited therein.

The numeral 30 designates a longitudinally arranged shaft mounted in suitable bearings upon the frame 1. This shaft 30 has one of its ends provided with a driving pulley 31 which is adapted to be connected through the medium of a suitable belt with a source of power by which the mechanism heretofore described is operated. The shaft 30 has its central portion provided with screw threads 32, which are adapted to mesh with a toothed wheel 33 mounted upon a shaft 34 provided with suitable bearings upon the frame and having its upper extremity provided with a beveled wheel 35. This beveled wheel 35 is adapted to mesh with a suitable beveled wheel 36 having a longitudinally extending shaft 37 which has its free extremity provided with a similar beveled wheel 38 which in turn meshes with a beveled wheel 39 mounted upon the shaft of the receiving wheel 18. The cylindrical member 22 carrying the arms 23 and the offset portion 25 are also rigidly secured upon the shaft 34 so that these members are adapted to rotate with the said shaft. The shaft 37 is provided with an additional beveled cog wheel 40 which in turn meshes with a beveled wheel 41 provided upon the cog wheel 11, and thus imparts motion to the said cog wheel and to the endless conveyer 12. The cog wheel 10 is provided with a beveled wheel 42 which is adapted to mesh with a similar beveled wheel 43 mounted upon a shaft 44 and this shaft 44 has its extremity provided with a similar beveled wheel 45 meshing with a larger beveled wheel 46 provided upon a shaft 47 having its extremity provided with a beveled wheel 46 which is adapted to mesh with a similar wheel 47 provided upon the shaft of the feed wheel 6. By this arrangement it will be noted that as motion is imparted to the drive-shaft 30, through the medium of the motive power connected with the pulley wheel 31, the shaft 34 is caused to rotate carrying with it the arms 23 provided with cups 26 and at the same time imparting motion to the endless conveyer and to the receiving wheel 18 and the feed wheel 7.

The opposite end of the shaft 30 to that occupied by the drive wheel 31 is provided with smaller drive wheels 50 and 51 and these wheels are provided with a twisted and a straight belt connected with suitable pulleys 52 provided upon the cleaning members 17 and 18.

In Fig. 4 we have illustrated a device similar to that previously described, but in which the chute 54 is adapted to deliver fruit to the pockets of a receiving or feed wheel 56. The fruits positioned within the pockets of the feed wheel 56 are deposited upon an endless conveyer 57 of a construction similar to that previously described and the fruits are subjected to the same process of cleaning and revolving through the medium of the brush members 58 and the inclined faces of the track 59. The fruit in this instance is deposited upon an endless conveyer 60 and will from thence be delivered to a suitable receptacle. In the device illustrated in Fig. 4 it will be understood that the fruit are not sized but are simply cleaned and the mechanism for operating the different elements are substantially the same as that heretofore described.

What is claimed as new is:—

1. The combination with a feed wheel, and a receiving wheel, each of said wheels being provided with peripheral pockets, of a track composed of a pair of spaced members between said wheels, wedge-shaped faces upon each of the sides of the track, an endless conveyer between the members of the track, projecting fingers upon the endless conveyer, oppositely disposed rotary cleaning members adjacent the track and conveyer, and means for operating the wheels, conveyer and cleaning means.

2. A frame, an inclined hopper upon the frame, a feed wheel upon the frame positioned within the path of the inclined hopper, a receiving wheel provided with peripheral pockets upon the frame, an inclined floor below the receiving wheel, a track comprising a pair of spaced members, an endless conveyer between the members of the track, spaced projections upon the conveyer, rotary cleaning means adjacent each side of the track and adapted to contact the conveyer, and means for rotating the said wheel, receiving wheel, conveyer and cleaning members.

3. A frame, an inclined hopper upon the frame, a feed wheel having peripheral pockets within the path of the inclined hopper, a curved guide member upon the frame adjacent one side of the feed wheel, a receiving wheel upon the frame, a table beneath the receiving wheel, said table being provided with an outlet opening, a track between the receiving wheel and the feed wheel, said track having its sides provided with inclined faces, an endless conveyer between the feed wheel and the receiving wheel, said conveyer being provided with spaced upright members having heads, cleaning members adapted to contact the endless conveyer, cup shaped receiving members for the opening of the table, means for rotating the cup shaped members, and means for operating the said feed and receiving wheels, the endless conveyer and the cleaning members.

In testimony whereof we affix our signatures in presence of two witnesses.

HERBERT K. ROWLAND.
LARS H. LARSEN.

Witnesses:
HARRIET MAXWELL,
L. A. COOK.